(12) United States Patent
Hofmann et al.

(10) Patent No.: US 7,170,255 B2
(45) Date of Patent: *Jan. 30, 2007

(54) FEEDFORWARD CONTROLLER FOR SYNCHRONOUS RELUCTANCE MACHINES

(75) Inventors: Heath F. Hofmann, State College, PA (US); Claude Khalizadeh, Newbury Park, CA (US)

(73) Assignee: Pentadyna Power Corporation, Chatsworth, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/290,354

(22) Filed: Nov. 30, 2005

(65) Prior Publication Data

US 2006/0076919 A1  Apr. 13, 2006

Related U.S. Application Data

(63) Continuation of application No. 10/887,344, filed on Jul. 7, 2004, now Pat. No. 7,078,876.

(60) Provisional application No. 60/484,674, filed on Jul. 7, 2003.

(51) Int. Cl.
*H02P 23/00* (2006.01)
(52) U.S. Cl. ............... 318/701; 318/700; 318/254
(58) Field of Classification Search .......... 318/700, 318/701, 254
See application file for complete search history.

(56) References Cited

U.S. PATENT DOCUMENTS 4,888,513 A * 12/1989 Fratta ............... 310/216
5,703,456 A * 12/1997 Cox ............... 318/701

* cited by examiner

*Primary Examiner*—Rita Leykin
(74) *Attorney, Agent, or Firm*—Paul D. Chancellor; Jeffrey F. Craft; Jackson, DeMarco, Tidus & Packerpaugh

(57) ABSTRACT

The present invention provides an electro-mechanical energy exchange system with a variable speed synchronous reluctance motor-generator having an all-metal rotor. A bi-directional AC-to-DC electric power converter interconnects the motor-generator with a DC bus. First and second hybrid controllers provide current regulation for the motor-generator and voltage regulation for the DC bus. Use of both feedback and feedforward control elements provides a controller particularly suited for operating high speed devices.

15 Claims, 6 Drawing Sheets

FEEDFORWARD CONTROLLER FOR SYNCHRONOUS RELUCTANCE MACHINES

This application is a continuation of U.S. application Ser. No. 10/887,344 filed Jul. 7, 2004 now U.S. Pat. No. 7,078,876, which claims priority from and incorporates Provisional Application 60/484,674 filed Jul. 7, 2003.

BACKGROUND OF THE INVENTION

1. Field of the Invention

The present invention relates to the electro-mechanical arts and energy storage systems. In particular, the present invention pertains to mechanical energy exchange systems coupled with electrical energy exchange systems.

2. Description of Related Art

Electro-mechanical energy exchange systems have provided mechanical and electrical power solutions for over one hundred years. These solutions have typically involved a prime mover driving an AC generator at a fixed speed multiple of the synchronous frequency. These power solutions have not required electronic processing of the generator output since the generator is a constant speed machine able to generate a sinusoidal electric output at the desired fixed frequency.

Advanced mechanical energy storage devices like high speed flywheels pose new challenges to traditional electro-mechanical energy exchange solutions. No longer able to rely on fixed speed operation and the attendant fixed frequency of a connected AC generator, these new systems require that each watt of electric power produced in a variable speed generator be processed through power electronics using semiconductor switches to synthesize a fixed frequency AC output.

With the need to process variable frequency AC power using power electronics comes the need for high speed semiconductor switching devices. At high shaft speeds and hence high electrical frequencies, the resolution of command voltages used to switch the semiconductors on and off decreases due to a fixed semiconductor switching frequency. This creates difficulties with feedback control techniques typically used to control these systems since the assumptions of continuous-time control theory typically used to develop feedback controllers become less appropriate.

SUMMARY OF THE INVENTION

Now, in accordance with the invention, there has been found a synchronous reluctance machine and control system including a bi-directional AC-to-DC electric power converter interconnecting and exchanging electric power between a synchronous reluctance motor-generator and a DC bus wherein said power exchange is controlled by a plurality of controllers operably coupled to said converter and wherein at least one of the controllers is a feedforward controller.

Further, there has been found an energy conversion system comprising a bi-directional AC-to-DC electric power converter interconnecting and exchanging electric power between a synchronous reluctance motor-generator having an all-metal rotor rotatably coupled to a mechanical energy exchange device like a flywheel and a DC bus. The power exchange is controlled by a plurality of current controllers operably coupled to said converter wherein a first controller is a feedforward controller and a second controller is a feedback controller.

BRIEF DESCRIPTION OF THE DRAWINGS

The present invention is described with reference to the accompanying drawings that illustrate the present invention and, together with the description, explain the principles of the invention enabling a person skilled in the relevant art to make and use the invention.

DESCRIPTION OF THE PREFERRED EMBODIMENTS

Figure 1:
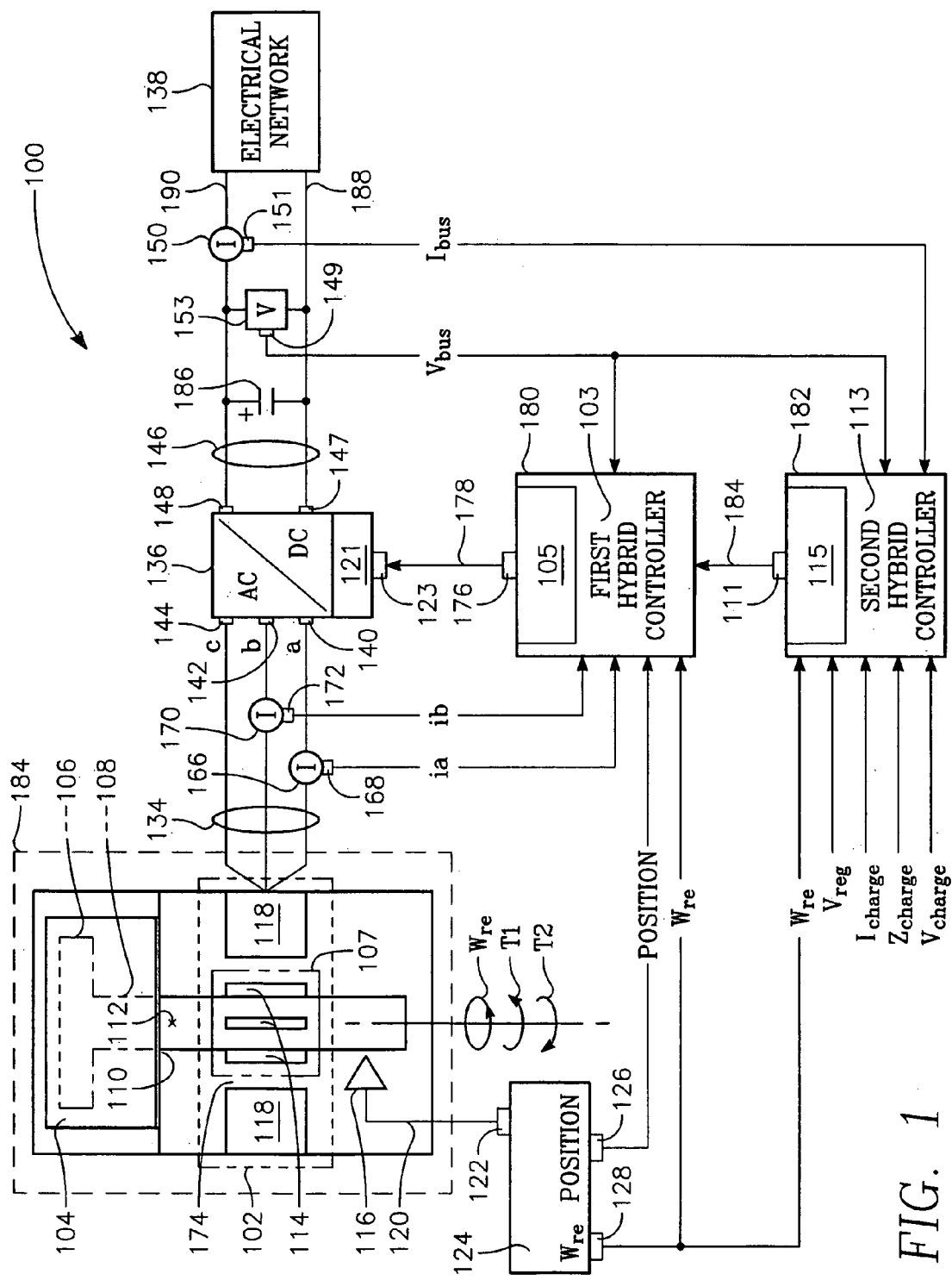
FIG. 1 is a diagram showing modules included in the feedforward controller for synchronous reluctance machines constructed in accordance with the present invention.

FIG. 1 shows the feedforward controller for a synchronous reluctance machine 100 of the present invention. The feedforward controller for a synchronous reluctance machine includes synchronous reluctance machine module 184, bi-directional AC-to-DC electric power converter 136, first hybrid controller 180, and second hybrid controller 182.

The machine module 184 includes a synchronous reluctance motor-generator 102. The motor-generator includes a rotor 107 having a plurality of rotor lobes 114 and an electrical stator 118 spaced apart from the rotor by an air gap 174. The rotor 107 may be an all-metal rotor formed entirely from electrically conductive materials. The rotor is integral with a first shaft portion 112. The first shaft portion has a shaft coupling 110 that is connected to a mechanical energy exchange device 104 and rotates at an angular velocity wre. A shaft speed transducer 116 is proximate to the first shaft portion. A rotor position signal conductor 120 interconnects the transducer and a third controller 124. The third controller outputs include the shaft angular position output 126 and the shaft angular speed wre signal output 128. The speed sensor is selected from devices employing a known technology including magnetic and or optical sensing technologies.

As a person of ordinary skill in the art will recognize, the mechanical energy exchange device 104 may be a single device or multiple interconnected devices. Mechanical energy exchange devices include flywheels, prime movers, electric motors, non-electric motors, and other devices having a rotatable mechanical connection. Optional flywheel mass 106 is shown coupled to the first shaft portion 112 by a second shaft portion 108.

The converter 136 interconnects motor-generator 102 with a DC bus 146. The converter includes a driver module 121. The electrical phases a, b, c of the motor-generator are connected to respective converter AC inputs 140, 142, 144. First and second converter DC outputs 146, 147 are connected to respective first and second DC bus conductors 188, 190. Phase current signals ia and ib are provided at the respective outputs 168, 172 of the respective first and second phase current sensors 166, 170.

The DC bus interconnects the converter 136 with an electrical network 138 via first and second DC bus conductors 188, 190. A capacitor 186 is connected in parallel with the DC bus. The capacitor may be a single device or multiple interconnected devices and it may be a film, electrolytic, or super capacitor type or another known electrical device having electrical energy storage capabilities. Bus voltage signal Vbus is provided at the output 149 of parallel connected DC bus voltage sensor 153. The bus current signal Ibus is provided at the output 151 of the series connected DC bus current sensor 150.

The first hybrid controller 180 interconnects the converter 136 and the second hybrid controller 182. The first hybrid controller includes first hybrid controller signal input block 103 and first hybrid controller module 105. Control voltage bus 178 interconnects first hybrid controller output 176 with converter input 123. The signal input block 103 is interconnected with ia, ib, position, and Vbus signals via respective signal conductors.

The second hybrid controller 182 includes second hybrid controller signal input block 113 and second hybrid controller module 115. A peak current signal conductor 184 interconnects a peak current output 111 of the second hybrid controller 182 with input block 103 of the first hybrid controller 180. The second hybrid controller signal input block 113 is interconnected with wre, Vreg, Icharge, Zcharge, Vcharge, Vbus, and Ibus signals via respective signal conductors.

Figure 2:
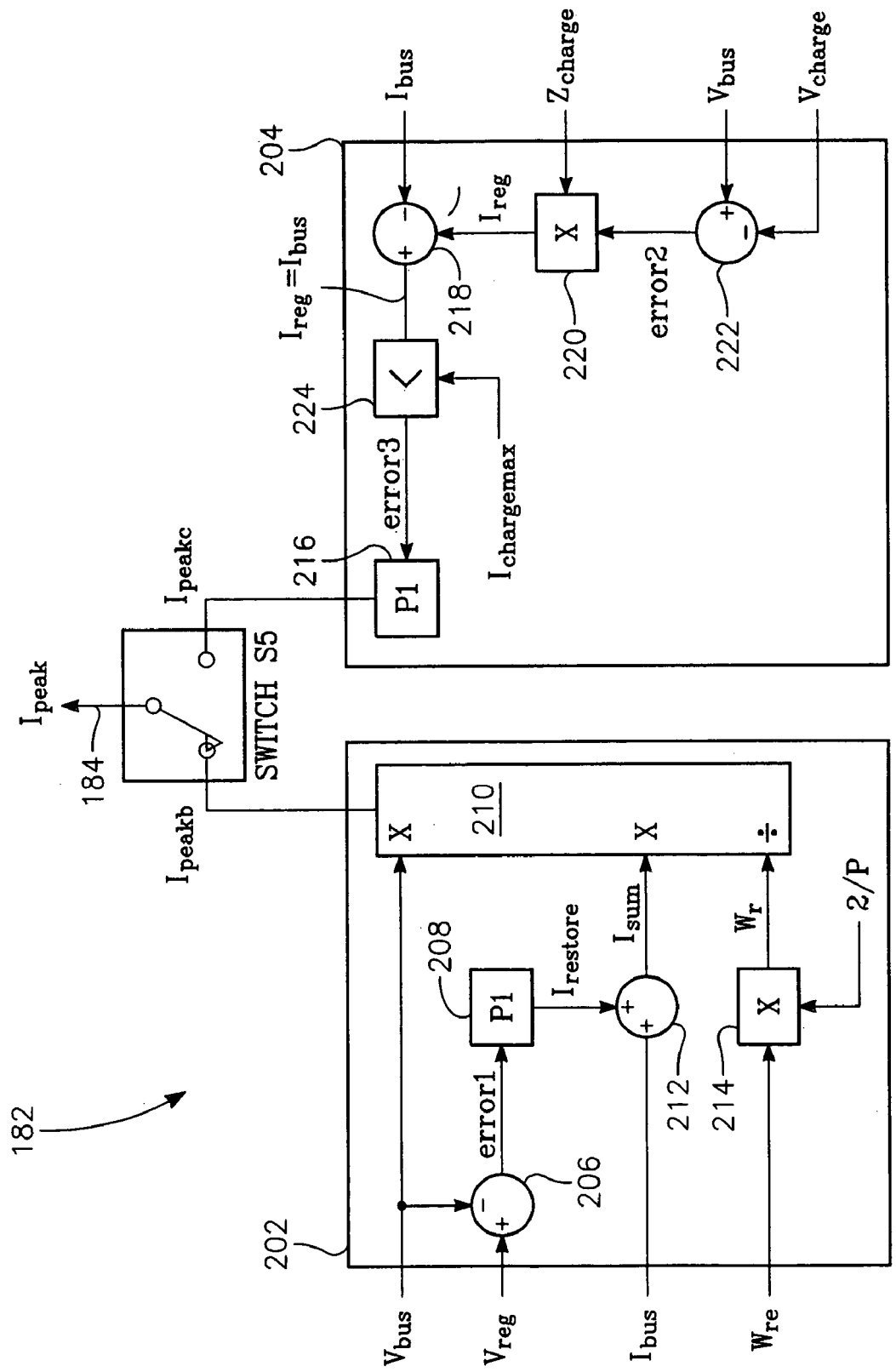
FIG. 2 is a diagram showing elements of a second hybrid controller of the feedforward controller for synchronous reluctance machines of FIG. 1.

FIG. 2 shows details of second hybrid controller 182. The second hybrid controller includes a first controller 202 that is a feedback bus voltage regulator. The second hybrid controller also includes a second controller 204 that is a charge current regulator. Respective first and second controller outputs Ipeakb and Ipeakc are inputs to switch S5. Switch S5 provides for the selection of either Ipeakb or Ipeakc as its output Ipeak.

The first controller 202 provides a current command output Ipeakb calculated to reduce the error between bus voltage Vbus and a regulation voltage Vreg. The first controller's output Ipeakb is ((Vbus*Isum)/wr) as implemented in the mathblock1 210. Isum is (Ibus+Irestore) as implemented in the mathblock2 212 where Irestore is the output of first proportional integral (PI) controller 208. The error signal error1 input to controller 208 is the difference between inputs (Vreg−Vbus) as implemented in the mathblock3 206. The rotor velocity wr is (wre/(2/P)) as implemented in the mathblock4 214. P is the number of poles of the synchronous reluctance motor-generator 102.

The second controller 204 provides a current command output Ipeakc calculated to reduce the error between bus current Ibus and a regulation current Ireg. The second 216 controller's output Ipeakc is the output of a second proportional integral (PI) controller 216. The error signal error3 input to the controller 216 is the lesser of the difference (Ibus−Ireg), as implemented in the mathblock5 218, and Ichargemax as implemented in the limiter 224. Ibus and Ichargemax are controller inputs. Ireg is the product (zcharge×error2) as implemented in the mathblock6 220. zcharge is a controller input. Error signal error2 is (Vbus−Vcharge) as implemented in the mathblock7 222.

Figure 3:
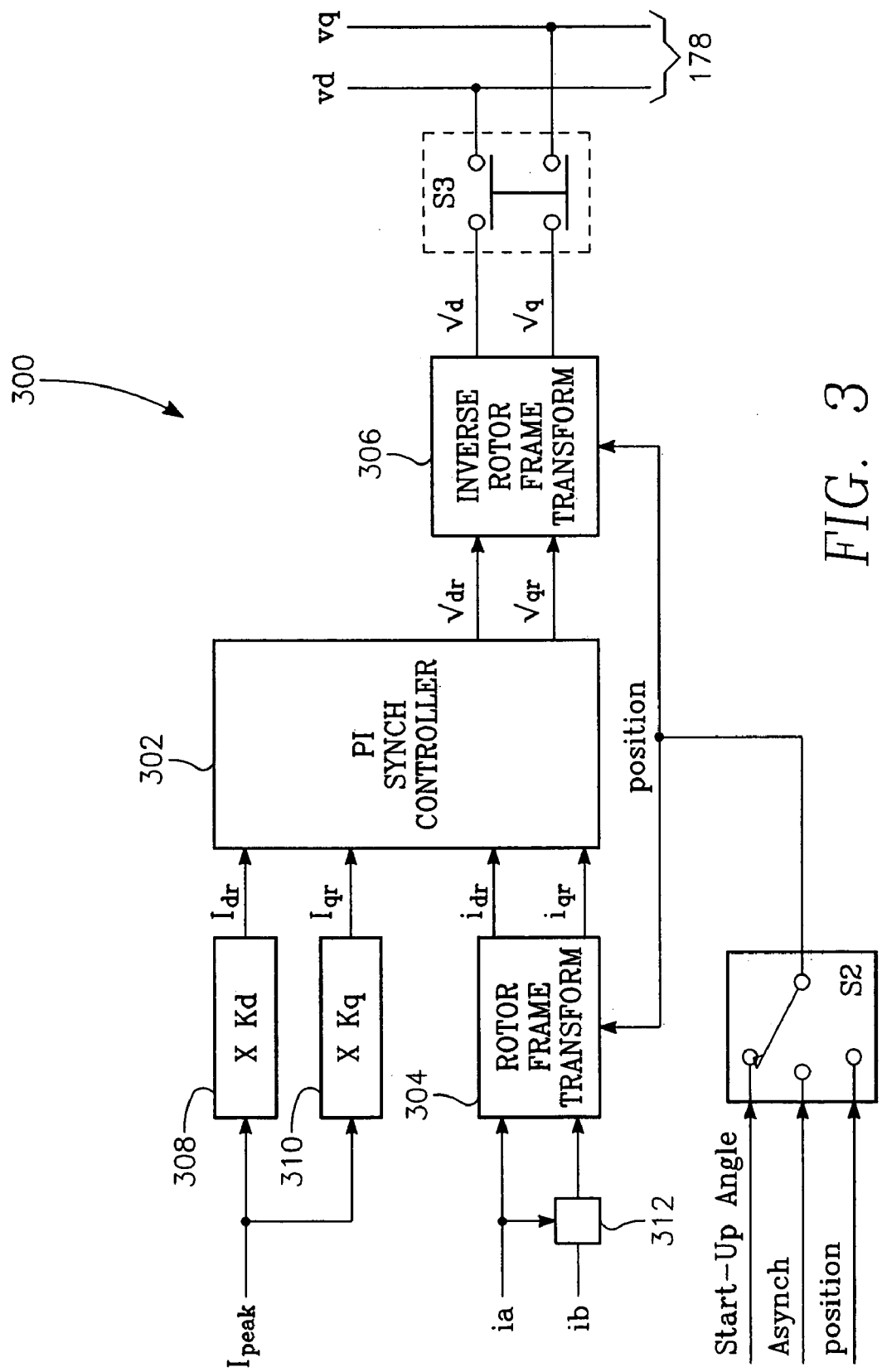
FIG. 3. is a diagram showing feedback control elements of a first hybrid controller of the feedforward controller for synchronous reluctance machines of FIG. 1.
Figure 4:
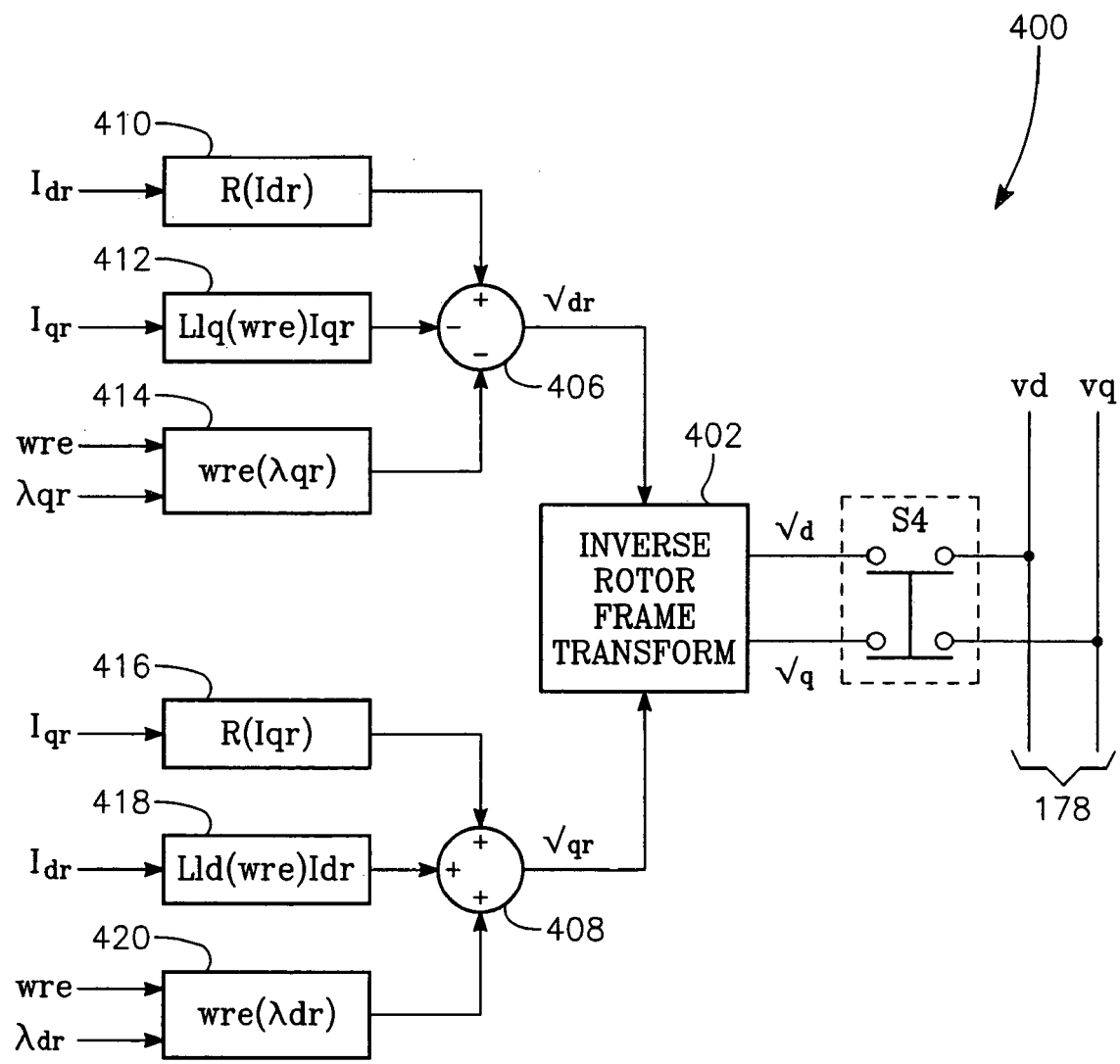
FIG. 4 is a diagram showing feedforward elements of a first hybrid controller of the feedforward controller for synchronous reluctance machines of FIG. 1.

FIGS. 3 and 4 show elements of the first hybrid controller 180. FIG. 3 shows a third controller 300 that is a feedback controller element and FIG. 4 shows a fourth controller 400 that is a feedforward controller element. The vq, vd control voltage bus 178 is connected to either the output of the third controller or the output of the fourth controller via switches S3 and S4 respectively.

FIG. 3 shows third controller 300 that operates to reduce error terms (Idr−idr) and (Idq−idq). Idr and Iqr are control currents derived from the Ipeak signal output of the second hybrid controller 182. Currents idr and idq are feedback signals derived from currents measured in phases a and b of the motor-generator.

Idr=Ipeak(Kd)
Iqr=Ipeak(Kq)
Kd=f(wre)
Kq=sqrt(1−(Kdθ2))

The third controller 300 includes a third proportional integral (PI) synchronous controller 302, a rotor frame transformation block 304, an inverse rotor frame transformation block 306, input switch S2, output switches S3, mathblock8 308, mathblock9 310, and mathblock10 312.

The output vd, vq of third controller 300 is provided by the output of switch S3 via control voltage bus 178 to the driver module 121 when switch S3 is closed. The output of the inverse rotor frame transform block 306 provides the vd, vq inputs to switch S3. The third PI controller 302 outputs provide the rotor reference frame direct and quadrature voltages vdr, vqr to the inputs of the inverse transform block 306. The Idr input to controller 302 is (Ipeak×Kd) as implemented in the mathblock8 308 where Kd is a function of wre. The Iqr input to controller 302 is (Ipeak×Kq) as implemented in the mathblock9 310 where Kq is a function of wre. The rotor frame transform block 304 provides measured current signals in the rotor reference frame idr, idq as inputs to controller 302. Inputs to the rotor frame transform block 304 include measured current signals id, iq. The id input is equal to ia. The iq signal is a function of ia, ib as implemented in the mathblock10 312 (iq=ia(q/sqrt(3))+ib (2/sqrt(3))).

An additional input to the rotor frame and inverse rotor frame transform blocks 304, 306 is a position signal provided by the output of switch S4. Inputs to switch S4 include Start-Up Angle, Zero, and Position.

FIG. 4 shows fourth controller 400. This controller provides direct and quadrature voltage output commands vd, vq based on a predictive model of synchronous reluctance motor-generator 102. The direct and quadrature control voltages each depend upon resistive voltage drop, inductive back emf, and air gap flux back emf terms.

The control voltage output vd, vq of the controller 400 is provided by the output of switch S4 via control voltage bus 178 to the driver module 121 when switch S4 is closed. The vd, vq inputs to switch S4 are the outputs of inverse transform block 402. the vdr input to the inverse transform block is (R(idr)−Llq(wre)iqr−wre(λqr)) as implemented in the mathblock11 406. Mathblock12 410 implements R(idr), the direct value of resistive voltage drop in the stator 118. Mathblock13 412 implements Llq(wre)iqr, the direct inductive back electromotive force in the stator. Mathblock14 414 implements wre(λqr), the direct air gap flux back electromotive force resulting from the airgap 174 between the stator 118 and the rotor lobes 114. The direct air gap flux is evaluated as follows:

$$\lambda dr = \int_0^\tau -\frac{Rdr}{Ldr}\lambda dr + Rdr\left(\frac{Md}{Ldr}\right)^2 idr\ dt$$

-continued where $\dfrac{Rdr}{Ldr}$ is the inverse of the Direct Rotor Time Constant(1/sec)

and $Rdr\left(\dfrac{Md}{Ldr}\right)^2$ is the Direct Rotor Excitation Constant (ohms)

The vqr input to inverse transform block 402 is (R(iqr)+Lld (wre)idr+wre(λdr)) as implemented in the mathblock15 408. Mathblock16 416 implements R(iqr), the quadrature value of resistive voltage drop in the stator 118. Mathblock17 418 implements Lld(wre)idr, the quadrature inductive back electromotive force in the stator. Mathblock18 420 implements wre(λdr), the quadrature air gap flux back electromotive force resulting from the airgap 174 between the stator and the rotor. The quadrature air gap flux term is evaluated as follows:

$$\lambda qr = \int_0^t -\dfrac{Rqr}{Lqr}\lambda qr + Rqr\left(\dfrac{Mq}{Lqr}\right)^2 iqr\, dt$$

where $\dfrac{Rqr}{Lqr}$ is the inverse of the

Quadrature Rotor Time Constant(1/sec)

and $Rqr\left(\dfrac{Mq}{Lqr}\right)^2$ is the Quadrature Rotor Excitation Constant (ohms)

Figure 5:
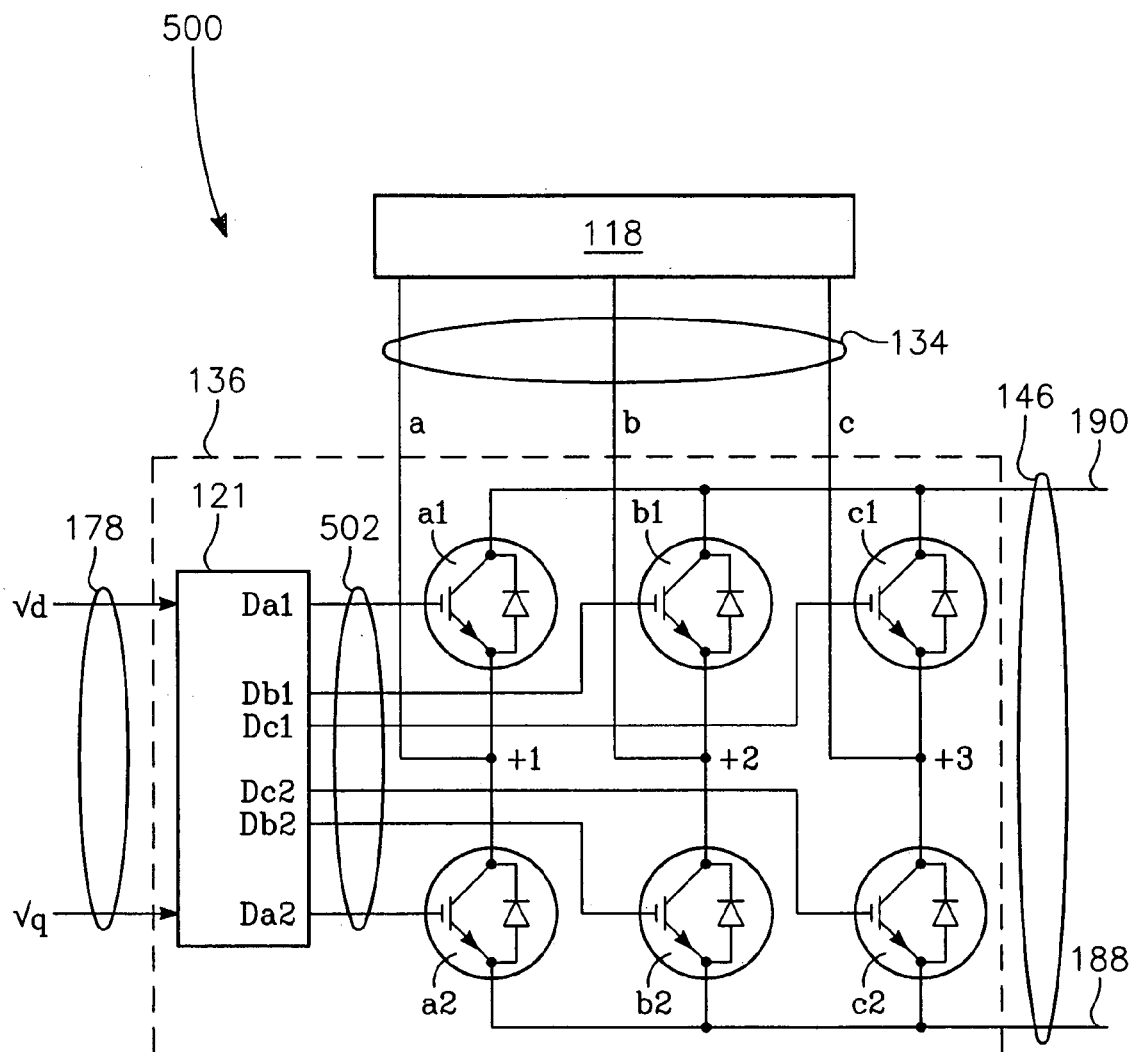
FIG. 5 is a diagram showing elements of the bi-directional AC-to-DC electric power converter of the feedforward controller for synchronous reluctance machines of FIG. 1.

FIG. 5 shows the bi-directional AC-to-DC electric power converter 500 comprising converter 136. The converter includes a driver module 121 that receives control voltages vd, vq from the first hybrid converter 180 via control voltage bus 178. The driver module provides three pairs of outputs Da1/Da2, Db1/Db2, and Dc1/Dc2. The driver output pairs are connected to the respective gates of semiconductor switches a1/a2, b1/b2, and c1/c2. Driver operation turns the switches on and off. The emitters of semiconductors a1, b1, c1 are interconnected with the collectors of semiconductors a2, b2, c2 and phases a, b, c at phase junctions t1, t2, t3. The collectors of a1, b1, c1 are connected to positive DC link 190; the emitters of a2, b2, c2 are connected to a negative DC link 188. Appendix 1 provides additional details relating to the feedforward controls for synchronous reluctance machines.

In operation, the feedforward controller for a synchronous reluctance machine 100 controls the bi-directional exchange of mechanical power between a mechanical energy exchange device 104 (like a flywheel) and the synchronous reluctance motor-generator 102. The motor-generator may be operated in generating modes and in charging modes. In the generating mode, mechanical energy is transferred to the motor-generator when the motor-generator exerts a resisting torque T2 tending to slow the rotational speed wre of the shaft 112.

During the generating mode, electric power is generated at a variable frequency depending upon the speed of the shaft wre and the number of poles on the motor-generator rotor 114. The bi-directional AC-to-DC electric power converter 136 receives electric power from the motor-generator via phase conductors a, b, c and provides a DC output on DC bus 146. Capacitor 186 provides both ripple control/smoothing of the output and electric energy storage. Electrical network 138 and the capacitor are electrical loads when the motor-generator is generating electric power.

During the charging mode, mechanical energy is transferred to the mechanical energy exchange device 104 when the motor-generator exerts an advancing torque T1 tending to increase the rotational speed wre of the shaft 112. The bi-directional AC-to-DC electric power converter 136 receives DC power from the electric network 138 via the DC bus 146, converts the DC power to AC power and transfers AC power to the motor-generator via phase conductors a, b, c.

The bi-directional AC-to-DC electric power converter 136 is controlled by first and second hybrid controllers 180, 182. The second hybrid converter provides a current setpoint Ipeak to the first hybrid converter: Ipeak is a function of DC bus current Ibus and voltage Vbus. The second hybrid controller provides control voltage outputs vd, vq; the control voltage outputs vd, vq are functions of Ipeak. Driver module 121 synthesizes pulse width modulated (PWM) gate driver outputs 502 that are a function of inputs vd, vq from the control voltage bus 178. Converter 136 exchanges electric power between the AC bus 134 and the DC bus 146 as semiconductor switches within the converter are modulated by the driver module's PWM outputs 502.

Figure 6:
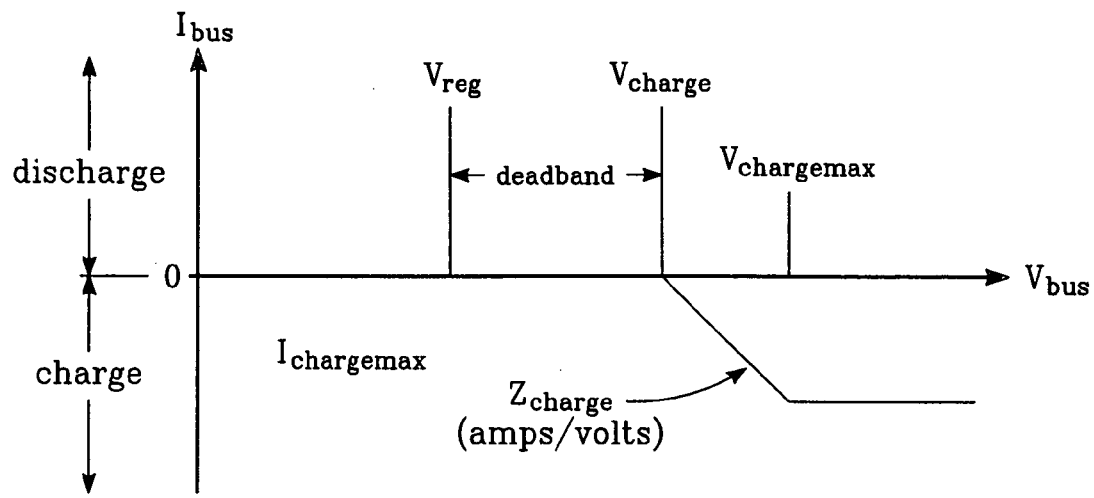
FIG. 6 is a chart showing operating modes of the second hybrid controller of the feedforward controller for synchronous reluctance machines of FIG. 1.

The second hybrid converter's Ipeak output is the output of a SPDT switch S5. The switch selects either an output of first controller 202 or an output of the second controller 204. With reference to FIG. 6, the second hybrid converter can be operated in a charging mode or a discharging mode. In charging mode, Vbus is greater than Vcharge and S5 is at setting 2; the second controller's output Ipeakc is selected. In charging mode, the lesser of a current error (Ireg−Ibus) or a maximum charge rate Ichargemax is input to second PI controller 216 whose output is Ipeakc (See FIG. 2). The Ireg value is derived from the product of an amps/volt ratio zcharge and a voltage error (Vbus−Vcharge). As long as (Ireg−Ibus) remains below Ichargemax, the charge current will be controlled by the amps/volt ratio zcharge. Otherwise, the maximum charge current will be limited by Ichargemax. This charging profile may be adapted to duplicate that of an electric storage battery or another electric energy storage device.

With continued reference to FIG. 6, the first controller 202 functions as a feedback controller. In the first controller a constant operating point of the machine is used to determine the direct and quadrature currents in the rotor reference frame for a peak current command Ipeak. A positive Ipeak command causes the motor-generator 102 to act as a generator in generating mode while a negative Ipeak command causes the motor-generator to act as a motor in charging mode. When Vbus is less than or equal to Vcharge, the second hybrid controller 182 is in discharging mode and switch S5 is at setting 1; the first controller's output Ipeakb is selected. The error between the bus voltage and a regulation voltage (Vreg−Vbus) is input to first PI controller 208. The output of the controller Irestore is combined with the load current Ibus to determine a total DC bus current command Isum. DC bus current Isum is in turn converted into a peak current command Ipeakb by mathblock1 210. This control regime maintains a minimum DC bus voltage of Vreg. This discharging profile may be adapted to duplicate that of an electric storage battery or another electric energy storage device.

Figure 7:
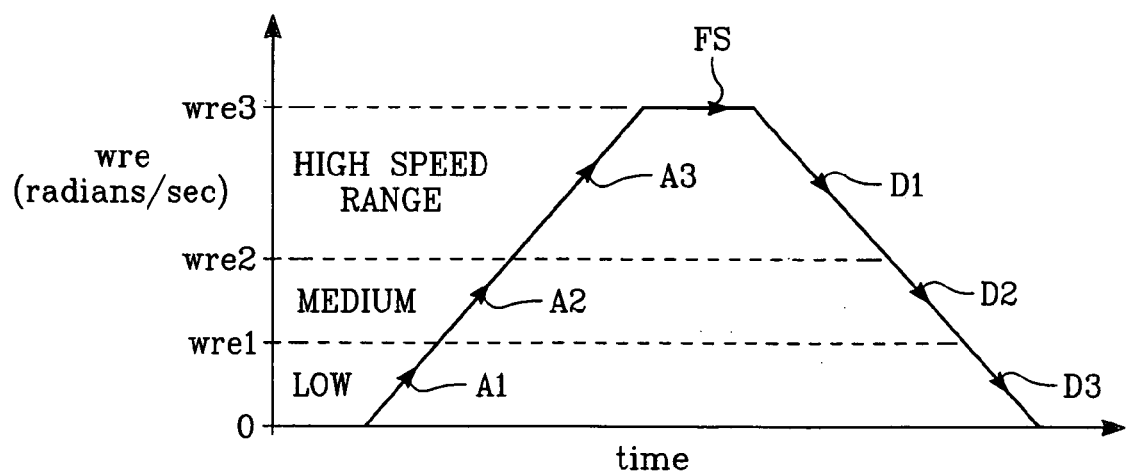
FIG. 7 is a chart showing operating modes of the first hybrid controller of the feedforward controller for synchronous reluctance machines of FIG. 1.

The first hybrid controller 180 includes third controller 300, a feedback controller and a fourth controller 400, a feedforward controller. Referring now to FIG. 7, the controller selected depends upon the shaft speed wre. During acceleration of the shaft 112, the third controller (feedback control) is used for acceleration phases A1 and A2 having respective low speed (0 to wre1) and medium speed (>wre1 to wre2) ranges. Acceleration A3 in the high speed range (>wre2 to wre3) is under the control of the fourth controller (feedforward control). Similarly, during full speed operation and initial deceleration of the shaft, the fourth controller (feedforward control) is used for full speed operation FS (wre3) and for deceleration speed range D1 (wre3 to wre2). Deceleration phases D2 and D3 through respective medium (<wre2 to wre1) and low (<wre1 to de-minimus) speed ranges are under the control of the third controller (feedback control).

Third controller 300 includes a third PI controller 302 that operates to minimize current errors (Idr–idr) and (Iqr–iqr). Stator currents ia and ib are converted to direct and quadrature values id and iq before being transformed into rotor reference frame values idr, iqr by transform block 304. Setpoint currents Idr and Idq are derived from Ipeak. The PI controller outputs vdr and vqr in the rotor reference frame are transformed by inverse transform block 306 into command voltages vd, vq. When closed, DPST switch S3 interconnects the third controller outputs vd, vq to the command voltage bus 178.

Third controller 300 has operating modes depending upon rotor velocity wre. Switch S2 selects from Start-up angle, Zero, and Position inputs to provide position signals to transform block 304 and inverse transform block 306. When accelerating shaft 112 in the low speed range, Start-up is selected to provide a start-up rotor angle and fixed rotor velocity wre; this is an inductive start-up mode for the synchronous reluctance motor-generator while charging. Upon reaching wre2, position is selected and the actual rotor position is input. While decelerating and upon reaching wre1, Zero is selected to provide a "0" rotor position. This generates DC currents in the machine causing the rotor 107 to brake slowing shaft 112 through a combination of induction and reluctance torque.

First hybrid controller third controller 400 implements a model of the synchronous reluctance motor-generator 102 to predict the control voltage commands vd, vq present on the control voltage bus 178. Direct resistive, inductive, and air gap flux terms provide respective direct voltage terms 410, 412, 414 that are summed to predict the rotor reference frame direct control voltage vdr. Quadrature resistive, inductive, and air gap flux terms provide respective quadrature voltage terms 416, 418, 420 that are summed to predict the rotor reference frame quadrature control voltage vqr. Inverse transform block 402 converts vdr to vd and inverse transform block 408 converts vqr to vq. Switch S4 interconnects control voltages vd, vq with control voltage bus 178 when the S4 is closed. Table 1 below relates selected operating modes and first hybrid controller switch settings.

TABLE 1

Modes and First Hybrid Controller Switch Settings

| Mode | Switch S2 | Switch S3 | Switch S4 | Controller |
|---|---|---|---|---|
| Low Speed Range Accelerating | Start Up Angle | Closed | Open | Feedback |
| Medium Speed Range | Position | Closed | Open | Feedback |
| High Speed Range | Position | Open | Closed | Feedforward |
| Low Speed Range Decelerating | Zero | Closed | Open | Feedback |

Control voltage output commands vd, vq from the first hybrid controller connect with driver module 121 via control voltage bus 178. Driver module 121 provides pulse width modulated signals to sequentially operate the semiconductor gates/switches of converter 136. Semiconductor switching provides for the exchange of three phase electric power a, b, c between the AC bus 134 and the DC bus 146. Pulse width modulation of the semiconductor switches modulates the voltage of the AC and DC bus interconnections and the quantity of electric power exchanged. Appendix 1 provides additional details relating to the operation of the feedforward controls for synchronous reluctance machines.

While various embodiments of the present invention have been described above, it should be understood that they have been presented by way of example only, and not limitation. It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

APPENDIX 1 FOLLOWS

High-Speed Control of Synchronous Reluctance Machine with Solid Rotor

1 Model of Solid-Rotor Synchronous Reluctance Machine

A solid rotor of a synchronous reluctance machine can be simply modelled in the rotor reference frame by direct and quadrature windings, similar to that of an induction machine model. The two-phase flux-linkage/current relationships of the machine in the rotor reference are then given by:

$$\begin{bmatrix} \lambda_{sd}^r \\ \lambda_{rd}^r \end{bmatrix} = \begin{bmatrix} L_{sd} & M_d \\ M_d & L_{rd} \end{bmatrix} \begin{bmatrix} i_{sd}^r \\ i_{rd}^r \end{bmatrix}, \quad (1)$$

$$\begin{bmatrix} \lambda_{sq}^r \\ \lambda_{rq}^r \end{bmatrix} = \begin{bmatrix} L_{sq} & M_q \\ M_q & L_{rq} \end{bmatrix} \begin{bmatrix} i_{sq}^r \\ i_{rq}^r \end{bmatrix} \quad (2)$$

The stator voltage/current relationships are given by:

$$v_{sd}^r = R_s i_{sd}^r - \omega_{re} \lambda_{sq}^r + \frac{d\lambda_{sd}^r}{dt} \quad (3)$$

$$v_{sq}^r = R_s i_{sq}^r + \omega_{re} \lambda_{sd}^r + \frac{d\lambda_{sq}^r}{dt} \quad (4)$$

and the rotor dynamics are given by:

$$\frac{d\lambda_{rd}^r}{dt} = -R_{rd} i_{rd}^r$$

$$\frac{d\lambda_{rq}^r}{dt} = -R_{rq} i_{rq}^r \quad (5)$$

We will define the states of the system as the stator currents and the rotor flux-linkages. The rotor currents can be rewritten as:

$$i_{rd}^r = \frac{1}{L_{rd}}(\lambda_{rd}^r - M_d i_{sd}^r), \quad (6)$$

$$i_{rd}^r = \frac{1}{L_{rd}}(\lambda_{rd}^r - M_d i_{sd}^r), \quad (7)$$

hence the rotor dynamics are given by:

$$\frac{d\lambda_{rd}^r}{dt} = -\frac{R_{rd}}{L_{rd}}\lambda_{rd}^r + R_{rd}\frac{M_d}{L_{rd}}i_{sd}^r, \quad (8)$$

$$\frac{d\lambda_{rq}^r}{dt} = -\frac{R_{rq}}{L_{rq}}\lambda_{rq}^r + R_{rq}\frac{M_q}{L_{rq}}i_{sq}^r \quad (9)$$

and the stator fluxes can be written as $$\lambda_{sd}^r = L_{sd} i_{sd}^r + M_d i_{rd}^r \quad (10)$$
$$= \frac{L_{sd} L_{rd} - M_d^2}{L_{rd}} i_{sd}^r + \frac{M_d}{L_{rd}}\lambda_{rd}^r$$
$$= L_{lsd} i_{sd}^r + \frac{M_d}{L_{rd}}\lambda_{rd}^r,$$

$$\lambda_{sq}^r = L_{lsq} i_{sq}^r + \frac{M_q}{L_{rq}}\lambda_{rq}^r \quad (11)$$

and the dynamic equations for the stator are therefore given by:

$$v_{sd}^r = R_s i_{sd}^r - \omega_{re}\left(L_{lsq} i_{sq}^r + \frac{M_q}{L_{rq}}\lambda_{rq}^r\right) + \frac{d}{dt}\left(L_{lsd} i_{sd}^r + \frac{M_d}{L_{rd}}\lambda_{rd}^r\right)$$

$$= R_s i_{sd}^r - \omega_{re}\left(L_{lsq} i_{sq}^r + \frac{M_q}{L_{rq}}\lambda_{rq}^r\right) + L_{lsd}\frac{d i_{sd}^r}{dt} + \frac{M_d}{L_{rd}}\left(-\frac{R_{rd}}{L_{rd}}\lambda_{rd}^r + R_{rd}\frac{M_d}{L_{rd}}i_{sd}^r\right)$$

$$= \left(R_s + R_{rd}\frac{M_d^2}{L_{rd}^2}\right)i_{sd}^r - \omega_{re}L_{lsq}i_{sq}^r - \omega_{re}\frac{M_q}{L_{rq}}\lambda_{rq}^r - R_{rd}\frac{M_d}{L_{rd}^2}\lambda_{rd}^r + L_{lsd}\frac{d i_{sd}^r}{dt},$$

$$v_{sq}^r = R_s i_{sq}^r + \omega_{re}\left(L_{lsd} i_{sd}^r + \frac{M_d}{L_{rd}}\lambda_{rd}^r\right) + \frac{d}{dt}\left(L_{lsq} i_{sq}^r + \frac{M_q}{L_{rq}}\lambda_{rq}^r\right)$$

$$= \left(R_s + R_{rq}\frac{M_q^2}{L_{rq}^2}\right)i_{sq}^r + \omega_{re}L_{lsd}i_{sd}^r + \omega_{re}\frac{M_d}{L_{rd}}\lambda_{rd}^r - \frac{R_{rq}M_q}{L_{rq}^2}\lambda_{rq}^r + L_{lsq}\frac{d i_{sq}^r}{dt}$$

(12)

The complete dynamic equations for the system are therefore given by:

$$\frac{d\lambda_{rd}^r}{dt} = -\frac{R_{rd}}{L_{rd}}\lambda_{rd}^r + R_{rd}\frac{M_d}{L_{rd}}i_{sd}^r, \quad (13)$$

$$\frac{d\lambda_{rq}^r}{dt} = -\frac{R_{rq}}{L_{rq}}\lambda_{rq}^r + R_{rq}\frac{M_q}{L_{rq}}i_{sq}^r \quad (14)$$

$$\frac{d i_{sd}^r}{dt} = \quad (15)$$
$$\frac{1}{L_{lsd}}\left[v_{sd}^r - \left(R_s + R_{rd}\frac{M_d^2}{L_{rd}^2}\right)i_{sd}^r + \omega_{re}L_{lsq}i_{sq}^r + \omega_{re}\frac{M_q}{L_{rq}}\lambda_{rq}^r + R_{rd}\frac{M_d}{L_{rd}^2}\lambda_{rd}^r\right],$$

$$\frac{d i_{sq}^r}{dt} = \quad (16)$$
$$\frac{1}{L_{lsq}}\left[v_{sq}^r - \left(R_s + R_{rq}\frac{M_q^2}{L_{rq}^2}\right)i_{sq}^r + \omega_{re}L_{lsd}i_{sd}^r - \omega_{re}\frac{M_d}{L_{rd}}\lambda_{rd}^r + \frac{R_{rq}M_q}{L_{rq}^2}\lambda_{rq}^r\right]$$

By defining a new flux variable, $$\lambda_{ad}^r = \frac{M_d}{L_{rd}}\lambda_{rd}^r, \quad (17)$$

$$\lambda_{aq}^r = \frac{M_q}{L_{rq}}\lambda_{rq}^r$$

The dynamics can then be rewritten as follows, in vector format:

$$\frac{d\vec{\lambda}_a^r}{dt} = -\left[\frac{R_r}{L_r}\right]\vec{\lambda}_a^r + \left[R_r\left(\frac{M}{L_r}\right)^2\right]\vec{i}_s^r, \quad (18)$$

$$\frac{d\vec{i}_s^r}{dt} = [L_{ls}]^{-1}\left\{\vec{v}_s^r - \left[R_s + R_r\left(\frac{M}{L_r}\right)^2\right]\vec{i}_s^r + j\omega_{re}\left(|L_{ls}|\vec{i}_s^r + \vec{\lambda}_a^r\right) + \left[\frac{R_r}{L_r}\right]\vec{\lambda}_a^r\right\},$$

where the [x] represent diagonal matrices with direct and quadrature parameters along the diagonal. The dynamics can then be expressed in terms of 4 sets of parameters, rotor time constants $$\left[\frac{R_r}{L_r}\right],$$

rotor excitation constants $$\left[R_r\left(\frac{M}{L_r}\right)^2\right],$$

stator leakage inductances $[L_{ls}]$, and the stator resistance $R_s$. The stator leakage inductance can most likely be assumed to be a scalar, and this inductance and the stator resistance can be determined quickly through terminal measurements of the stator sans rotor.

The parameters $$\left[\frac{R_r}{L_r}\right] \text{ and } \left[R_r\left(\frac{M}{L_r}\right)^2\right]$$

can be determined as follows:

Command either a direct or quadrature current $\vec{i}_{sx}^{\,r}$ to the machine.

Instantaneously disable the PWM to the machine. The stator current should quickly (ideally instantaneously) go to zero.

In this case the stator voltage generated by the machine will be due to the rotor flux:

$$\vec{v}_s^{\,r} = j\omega_{re}\left[\frac{M}{L_r}\right]\vec{\lambda}_r^{\,r} \qquad (19)$$
$$= j\omega_{re}\vec{\lambda}_a^{\,r}$$

From this voltage we can therefore easily determine the flux linkage $\vec{\lambda}_a^{\,r}$. From the exponential decays of the voltage waveforms we can determine the rotor time constants $$\left[\frac{R_r}{L_r}\right].$$

This can best be done through a curve fitting of the extracted data. From the initial conditions we can determine the excitation parameters, for both direct and quadrature, as follows:

$$\left(\frac{M_x^2}{L_{rx}}\right) = \frac{\lambda_{ax}^r(t=0)}{i_{ax}}, \qquad (20)$$
$$R_{rx}\left(\frac{M_x}{L_{rx}}\right)^2 = \left(\frac{R_{rs}}{L_{rx}}\right)\left(\frac{M_x^2}{L_{rx}}\right),$$

The stator leakage inductances $L_{tsd}$ and $L_{tsq}$ can be assumed to be equal, and can be determined by measuring the inductance of the stator windings with the rotor removed.

2 Control Technique 2.1 Feedforward Control

The control algorithm currently in use at high speed is a feedforward method. Because of the nature of the flywheel system, it is straightforward to model the machine dynamics accurately. Hence, we can use the model developed above to determine the appropriate command voltages applied to the machine. The steady-state voltages for desired currents $i_{sd}^{\,r}$ and $i_{sq}^{\,r}$ and resulting air-gap fluxes $\lambda_{ad}^{\,r}$ and $\lambda_{aq}^{\,r}$ are given as follows:

$$v_{sd}^r = \left[R_s + R_{rd}\left(\frac{M_d}{L_{rd}}\right)^2\right]i_{sd}^r - \omega_{re}L_{lsq}i_{sq}^r - \omega_{re}\lambda_{aq}^r - R_{rd}\frac{M_d}{L_{rd}^2}\lambda_{ad}^r, \qquad (21)$$
$$v_{sq}^r = \left[R_s + R_{rq}\left(\frac{M_q}{L_{rq}}\right)^2\right]i_{sq}^r + \omega_{re}L_{lsd}i_{sd}^r + \omega_{re}\lambda_{ad}^r - R_{rq}\frac{M_q}{L_{rq}^2}\lambda_{aq}^r$$

The terms $$R_{rx}\left(\frac{M_q}{L_{rq}}\right)^2 i_{sx}^r \text{ and } R_{rx}\frac{M_x}{L_{rx}^2}\lambda_{ax}^r$$

will cancel each other once the "air-gap" flux reaches its final value. Because of this, and because of the difficulties associated with the determination of the $$R_{rx}\frac{M_x}{L_{rx}^2}$$

parameter, and because these terms are relatively small compared to the other terms at high-speed, we approximate the steady-state relations as follows:

$$v_{sd}^r \approx R_s i_{sd}^r - \omega_{re}L_{lsq}i_{sq}^r - \omega_{re}\lambda_{aq}^r, \qquad (22)$$
$$v_{sq}^r \approx R_s i_{sq}^r + \omega_{re}L_{lsd}i_{sd}^r - \omega_{re}\lambda_{ad}^r,$$

The "air-gap" flux can be estimated from the desired stator currents as follows:

$$\lambda_{ad}^r = \int_0^t -\frac{R_{rd}}{L_{rd}}\lambda_{ad}^r + R_{rd}\left(\frac{M_d}{L_{rd}}\right)^2 i_{sd}^r dt, \qquad (23)$$
$$\lambda_{aq}^r = \int_0^t -\frac{R_{rq}}{L_{rq}}\lambda_{aq}^r + R_{rq}\left(\frac{M_q}{L_{rq}}\right)^2 i_{sq}^r dt$$

2.2 Deadtime Compensation

As part of the feedforward control, we will also need to compensate for the deadtime effect. The dead-time associated with the phase legs will alter the desired average-value output voltage of the phase as follows:

$$\langle v_{out}(t)\rangle = \langle v_{command}(t)\rangle - \frac{V_{bus}t_d}{T_s}\frac{i_{out}}{|i_{out}(t)|}, \qquad (24)$$

where $t_d$ is the "dead" time and $T_s$ is the switching period, and $V_{bus}$ is the bus voltage. We can compensate for the fundamental component of the deadtime voltage using the command currents as follows:

$$v_{cd}^r = v_{sd}^r + \frac{4V_{bus}t_d}{\pi T_s}\frac{i_{sd}^r}{|i_{pk}|}, \quad (25)$$

$$v_{cq}^r = v_{sq}^r + \frac{4V_{bus}t_d}{\pi T_s}\frac{i_{sd}^r}{|i_{pk}|}$$

2.3 Concurrent Stationary Control

Because of the high electrical frequencies, the average-value outputs of the phase legs of the inverter will include small DC and sub-synchronous components. These can be reduced with a concurrent stationary PI feedback controller. As the bandwidth of this controller is centered around DC, a low bandwidth regulator will not interfere with the high-frequency desired currents.

Bus Voltage Regulator

The purpose of the flywheel system is to provide bus voltage regulation should loss of external power occur. The flywheel system comprises an inverter interconnecting a DC bus and an electric motor and a load or network interconnected to the inverter by the DC bus. The system includes a DC bus capacitor C to sustain the bus voltage during an outage until the flywheel system can power up. The current exchanged with the DC bus by the inverter is Iflywheel and the current exchanged with the DC bus by the load or network is Ibus. Summation of currents at the capacitor terminals yields the following expression:

$$I_{bus} + C\frac{dV_{bus}}{dt} = I_{flywheel} \quad (1)$$

Assuming 100% efficiency of the flywheel system, the current from the flywheel system is determined through conservation of power:

$$I_{flywheel} = \frac{\tau\omega_r}{V_{bus}} \quad (2)$$

where $\tau$ is the electromagnetic torque applied to the flywheel shaft and $\omega_r$ is the rotor velocity. An expression for the bus voltage dynamics is therefore given by $$\frac{dV_{bus}}{dt} = \frac{1}{C}\left(\frac{\tau\omega_r}{V_{bus}} - I_{bus}\right) \quad (3)$$

We therefore regulate the bus voltage through regulation of torque on the flywheel system. To linearize the dynamics and provide a feedback controller with a feedforward term for the bus current, the following command torque is used:

$$\bar{\tau} = \frac{V_{bus}}{\omega_r}\left(I_{bus} + K_p e_v + K_i \int_0^t e_v \, dt + K_d \frac{de_v}{dt}\right), \quad (4)$$

where $$e_v = \bar{V}_{1bus} - V_{bus} \quad (5)$$

The gains $K_p$, $K_i$, and $K_d$ are chosen to optimize response time. The torque command is then used to determine a peak current command to the motor. Under steady-state conditions, the flywheel torque is given by:

$$\tau = \frac{3P}{4}(L_d - L_q)i_d^r i_q^r \quad (6)$$

The direct and quadrature currents in the rotor reference frame are referred to the peak motor current $I_{pk}$ as follows:

$$i_d^r = K_d I_{pk}, \quad (7)$$

$$i_q^r = K_q I_{pk} \quad (8)$$

where $$K_q = \sqrt{1-K_d^2} \quad (9)$$

The peak current command is therefore given by:

$$\bar{I}_{pk} = \sqrt{\frac{4\bar{\tau}}{3P(L_d - L_q)K_d\sqrt{1-K_d^2}}} \quad (10)$$

The invention claimed is:

1. An energy conversion system comprising: a bi-directional AC-to-DC electric power converter electrically interconnecting and bi-directionally exchanging electric power between a synchronous reluctance motor-generator having an all-metal rotor and a DC bus, the power exchange being controlled by a plurality of current controllers operably coupled to the converter wherein a first controller is a feedforward controller, a second controller is a feedback controller and a control voltage output of at least one controller is a function of peak current.

2. A synchronous reluctance machine and control system comprising:
a bi-directional AC-to-DC electric power converter electrically interconnecting and bi-directionally exchanging electric power between a variable speed synchronous reluctance motor-generator and a DC bus;
the power exchange being controlled by a plurality of current controllers operably coupled to said converter;
the current controllers including a first controller that is a feedforward controller and a second controller that is a feedback controller;
the first and second controllers each having a control signal output that is a function of a peak current; and,
a plurality of synchronous reluctance motor-generator dependant control voltage terms wherein one or more of said control voltage terms are summed by a current controller to produce a control voltage output operably coupled to said converter.

3. The energy conversion system of claim 2 wherein the motor-generator includes an electrical stator spaced apart from a rotor by an air-gap.

4. The energy conversion system of claim 3 wherein the rotor and a flywheel mass are rotatably coupled and bi-directionally exchange mechanical power.

5. The energy conversion system of claim 4 wherein the control voltage output is a function of stator resistive voltage drop, stator inductive back electromotive force, and air-gap flux back electromotive force.

6. The energy conversion system of claim 4 wherein the control voltage output is a function of any one or combination of stator resistive voltage drop, stator inductive back electromotive force, and air-gap flux back electromotive force.

7. The energy conversion system of claim 6 wherein, the second controller limits the error between a stator current and a first current setpoint.

8. The energy conversion system of claim 7 wherein the first and second controllers produce two control voltage outputs representing direct and quadrature voltages.

9. The energy conversion system of claim 8 wherein a current controller that is a feedback controller controls the power exchange during a flywheel first speed range and the first controller controls the power exchange during a flywheel second speed range the maximum speed of said second speed range being greater than any speed of said first speed range.

10. An energy conversion system comprising:
a bi-directional AC-to-DC electric power converter interconnecting and exchanging electric power between a variable speed synchronous reluctance motor-generator and a DC bus;
a shaft interconnecting and exchanging mechanical energy between a mechanical energy exchange device and the synchronous reluctance motor generator;
a first hybrid controller interconnecting the bi-directional AC-to-DC electric power converter and a second hybrid controller;
the electric power exchange between the synchronous reluctance motor generator and the DC bus being controlled by a control voltage output of the first hybrid converter;
the first hybrid controller including a first feedback controller and a feedforward controller;
the second hybrid controller including a second feedback controller and a charge current regulator; and,
the first hybrid controller receiving in a first mode a signal from the second feedback controller and in a second mode a signal from the charge current regulator.

11. The energy conversion system of claim 10 wherein the second feedback controller is a voltage regulator.

12. The energy conversion system of claim 11 wherein during the first mode the mechanical energy exchange device is discharging and during the second mode the mechanical energy exchange device is charging.

13. The energy conversion system of claim 12 wherein the signals the first hybrid controller receives from the second hybrid controller include signals indicating a peak current setpoint.

14. The energy conversion system of claim 13 wherein the shaft has ranges of rotational speeds including a first shaft speed range and a second shaft speed range the maximum speed of the second shaft speed range exceeding any speed within the first shaft speed range.

15. The energy conversion system of claim 14 wherein the control voltage output of the first hybrid controller is derived from the first feedback controller during the first range of shaft speeds and from the feedforward controller during the second range of shaft speeds.

* * * * *